United States Patent [19]

Pasevic et al.

[11] Patent Number: 5,307,391
[45] Date of Patent: Apr. 26, 1994

[54] METHOD FOR TREATMENT OF PRIMARY COOLANT MEDIUM OF A PRESSURIZED WATER NUCLEAR REACTOR

[75] Inventors: Vladimir I. Pasevic; Dmitrii V. Pasevic, both of Mytisci, U.S.S.R.

[73] Assignee: Promotech Corporation, Vaduz, Liechtenstein

[21] Appl. No.: 926,572

[22] Filed: Aug. 6, 1992

[30] Foreign Application Priority Data

Aug. 9, 1991 [DE] Fed. Rep. of Germany ....... 4126468

[51] Int. Cl.$^5$ ................................................. G21C 9/00
[52] U.S. Cl. ..................................... 376/306; 376/305; 976/DIG. 379; 252/631
[58] Field of Search ............... 376/306, 305, 310, 313; 976/DIG. 376, DIG. 379; 252/631

[56] References Cited

U.S. PATENT DOCUMENTS

| | | | |
|---|---|---|---|
| 4,317,741 | 3/1982 | Lederle et al. | 252/77 |
| 4,376,753 | 3/1983 | Lucas | 376/305 |
| 4,981,641 | 1/1991 | Campion | 376/306 |

OTHER PUBLICATIONS

The Control of Erosion—Corrosion of Mild Steel Using an Oxygen-Ammonia-Hydrazine-Dosed Feedwater by D-Penfold, Nuclear Energy, 1986, 25; No. 5, Oct. (pp. 257-266).

Tackling Erosion-Corrosion in Nuclear Steam Generating Plant, by Bianold, Water Chemistry Jun. 1981 pp. (37-41).

*Primary Examiner*—Donald P. Walsh
*Assistant Examiner*—Meena Chelliah
*Attorney, Agent, or Firm*—Kane, Dalsimer, Sullivan, Kurucz, Levy, Eisele and Richard

[57] ABSTRACT

A method for treating the primary coolant of a pressure water reactor by controlling its efficiency through the $H_3BO_3$ content in the coolant is described. Hydrazine hydrate is continuously added to the coolant cycle of a nuclear reactor which is charged for energy generation in such amounts that its content is $5 \cdot 10^{-6}$ to $5 \cdot 10^{-2}$ g/kg coolant. Excess hydrogen is removed from the coolant leaving a content of no more than 100 n.ml/kg.

3 Claims, 1 Drawing Sheet

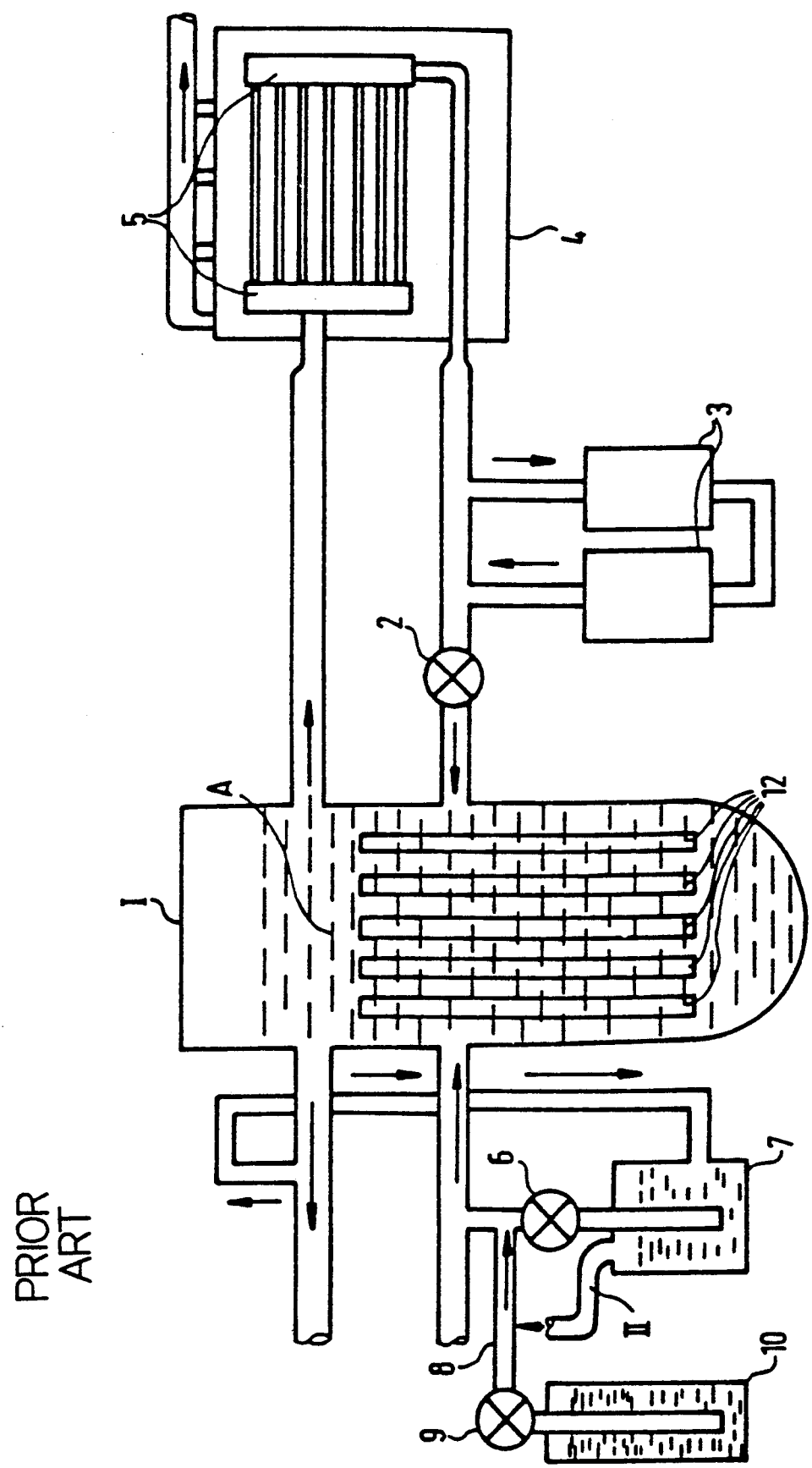

METHOD FOR TREATMENT OF PRIMARY COOLANT MEDIUM OF A PRESSURIZED WATER NUCLEAR REACTOR

BACKGROUND OF THE INVENTION

1. Field of the Invention

The invention relates to controlling reactor efficiency of a pressurized water nuclear reactor by boric acid content in the coolant.

2. Brief Description of Related Art

It is known that boric acid in the cooling medium of a nuclear reactor, used for control of the fuel reactivity, causes an increased material corrosion. Moreover, during the decomposition of the nuclear fuel strong flows of neutrons, gamma-radiation and $\alpha$ or $\beta$ particles act on the water and decompose the same into oxygen, hydrogen and a plurality of oxide radicals which increase material corrosion (Report of IAEA "Coolant Technology of Water Reactors", Doc. 0846j, Mar. 11, 1981, S. 27-29).

The corrosion products get into the radiation core in the form of insoluble oxides through neutron flow (fuel elements). They become radioactive, settle on the inner face of the reactor during feeding through the coolant cycle and form a radioactive contamination causing considerable technical difficulties during the operating, repairing and inspection of the reactor (Report of IAEA "Coolant Technology of Water Reactors", Doc. 0846j, Mar. 11, 1991, S. 54-55).

For reducing the corrosivity of the boric acid in the pressurized water reactors, 1 to 2 ppm LiOH (Report of IAEA "Coolant Technology of Water Reactors", Doc. 0846j, Mar. 11, 1991, S. 27-29) are added. Alternatively, taking into consideration the presence of ions like $Li^+$ and $NA^+$, 0.05-0.45 mM/kg KOH may be added.

For reducing the radiolysis of the water, hydrogen is added in pressurized water reactors and in water-water-reactors. Ammonia from which hydrogen is then released (Report of IAEA "Coolant Technology of Water Reactors", Doc. 0846j, Mar. 11, 1991, S. 27) may be added.

These methods permit the operation of nuclear reactors, however, do not assure any considerable lowering of the contamination of the reactor, i.e., the gamma-dosage efficiency of the individual parts of the steam generator is in a range of between 3 to 30 R/h (see Report of IAEA "Coolant Technology of Water Reactors", Doc. 08461, Mar. 11, 1991, S. 27-28).

The nuclear reactor operates in a known method in accordance with FIG. 1 as follows:

The primary cycle includes a reactor 1, a main circulating pump 2, ion exchange filter 3 for cleaning the coolant, a steam generator 4, a steamline 5 of the secondary cycle, a pump 6 for discharging the coolant, a feeding ventilator 7, cycle pipe lines 8 having a large diameter, a feeding pump 9, a pressure holder 10, a pressure reduction device 11 for ventilator and fuel elements 12 and a coolant A.

A dosage of 12 to 15 g/l boric acid solution is added to the primary cycle of reactor 1 which is fed with fresh fuel material. The ion exchange filter 3 for cleaning the coolant A is saturated with $H_3BO_3$ and KOH in a mixture with $NH_3$ up to a balanced concentration. Before operating the reactor 1 at a temperature of no more than 80° C. a hydrazine hydrate solution is added to the coolant A in a concentration which is above a three fold excess of the measured $O_2$ content for a chemical binding of the oxygen.

After executing the above mentioned operating steps the reactor is then physically accelerated until reaching a controlled minimum efficiency ($W-10^{-6}\%$).

After the required measuring of the physical parameter of the reactor plant, the reactor efficiency is then further accelerated up to the level of energy generation. At this point KOH is added to the coolant in an amount corresponding to the measured $H_3BO_3$ amount, however, no more than 0.45 mMol/kg and 5 to 10 mg/kg $NH_3$, with respect to the coolant. Thereafter, $H_2$ is released from $NH_3$ in view of the radioalysis 30 to 60 n.ml/kg, with respect to the coolant. With these chemical parameters the commercial operation of water-water-reactors is started. Since the radiolysis of the water occurs with a high speed due to the radiation effect and in that the reunification of the oxide radicals does not occur immediately during its reaction with $H_2$, the oxide radicals of the water result in material corrosion, whereby insoluble Co, Mn, Ni, Cr, Fe and other elements containing oxide compounds are generated.

Due to the coolant cycle the corrosion products are fed to the effective range of the nuclear fuel and are attracted by the wall of the fuel elements due to the released thermoelectric forces, whereby they are subjected to a tremendous neutron flow and convert into isotopes $^{58}Co$, $^{60}CO$, $^{54}Mn$, $^{51}Cr$, $^{59}Fe$ etc.

Under a constant reactor load the activated corrosion products slowly change over into the coolant water. However, during severe load fluctuations these products are violently washed off the walls of the fuel elements. However, in both cases metal oxide particles are distributed through the coolant cycle and deposit on the reactor walls due to isotope exchange or merely by sorption on the inner faces of the reactor (sorption coefficient $K+1 \cdot 10^{-4}$ sec. $^{-1}$) and therefore result in contamination. Equipment for cleaning the cooling medium reduces the content of activated products in the coolant with a coefficient $K+1 \cdot 10^{-5}$ sec. $^{-1}$ by removing a certain portion of the coolant. However, a complete cleaning of the coolant is not obtained with this measure. Finally a slow enrichment of radioactive isotopes builds up on the inner reactor face and results in contamination of the same. The known techniques enable the operation of nuclear reactors, however do not assure a considerable lowering of the contamination of the reactor, i.e., the Y-dosaging efficiency of the individual parts of the steam generator is in a range of between 3 and 30 R/H. The lowest Y-radiation dosage is obtained by adding KOH and $NH_3$ into the primary cycle of water-water-reactors. However, in this case the gamma-radiation dosage is still very high (at an average of 3 to 7 R/h), as is the case in the power plant in Lovisa (Finland), for example. The gamma-dosage efficiency ranges in pressurized water reactors of the type "Westinghouse" and "Siemens" (KWU) at 3 to 40 R/h or 3 to 45 R/h (see report of IAEA "Coolant Technology of Water Reactors", Doc. 0845j, Nov. 03, 1991, S 54-55).

Hence, nuclear plants which are presently in operation show the following disadvantages with respect to the water chemical operation:

1. Insufficient speed of the reunification of the oxide radicals under $H_2$ effect, whereby a corrosion of the reactor material occurs.

2. the combustion element wall, which results in its activation and subsequent migration through the coolant cycle.

3. The sorption coefficient of the activated corrosion products exceeds the cleaning coefficient with respect to the settling speed, so that in spite of the efficiency increase of the cleaning means a contamination of the reactor cannot be prevented.

It is an object of the invention to decrease the speed of material corrosion as well as to reduce the activation of the corrosion products and its depositing on the reactor walls, and in this manner to reduce the reactor contamination by a corresponding reduction of the gamma dosage efficiency to <3 R/h.

SUMMARY OF THE INVENTION

The object of the invention is achieved in accordance with the following description in that hydrazine hydrate is continuously added to the circulating coolant in the reactor in such an amount that its content is $5 \cdot 10^{-6}$ to $5 \cdot 10^{-2}$ g/kg coolant, whereby excess hydrogen is continuously removed from the reactor cycle so as to keep its concentration in a range of 30 to 60 n.ml/l.

BRIEF DESCRIPTION OF THE DRAWING

The accompanying drawing is a schematic drawing of a prior art nuclear reactor system.

DETAILED DESCRIPTION OF THE INVENTION

To date nobody operated a pressurized water nuclear reactor while continuously adding to the coolant hydrazine hydrate. This is because the hydrazine hydrate decomposes into nitrogen and hydrogen within 10 to 20 seconds and results in destruction of the fuel element sheaths of Zr alloys during a steady increase of the hydrogen concentration to over 60 n.ml/kg coolant. Surprisingly, it was found that new reactions are triggered under the effect of strong neutron flows and of gamma-rays of the operating reactor in a system consisting of hydrazine hydrate, ammonia and hydrogen, resulting in a radiation induced synthesis between the hydrazine hydrate from $NH_3$ and its decomposing products. The reverse synthesis of hydrazine hydrate from $NH_3$ and $H_2$ occurs much slower than the decomposition of hydrazine hydrate. The reaction is in accordance with the following equation:

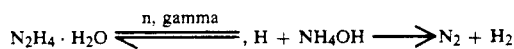

wherein n denotes neutrons and gamma denotes gamma-radiation.

For maintaining the equilibrium of reaction the hydrazine hydrate is added to the coolant continuously in the stated amounts with removal of the $H_2$ excess.

The hydrazine hydrate which represents a strong reducing agent results in a considerable reduction of the electrochemical potential ($E_h$) in the metal-water system. In the known methods the potential reaches no more than $-700$ mV with respect to the $H_2$ electrode, the speed of corrosion of nonrusting steel being about 0.5 mg/m² per hour. In a water-water-reactor of the type VVER-440 about 30 to 50 kg corrosion products are generated during an operating period of about 7000 operating hours. A further reduction of the $E_h$ potential into the negative range is not possible. Only a continuous adding of hydrazine hydrate enables a further lowering of the pH value and thereby a strong reduction of the speed of corrosion. Hydrazine hydrate reacts violently with $O_2$ and oxide radicals, forming hydrogen, nitrogen and water.

During the radiolysis of hydrazine hydrate atomic hydrogen, ammonia and nitrogen is generated. The reunification of the radicals into water therefor occurs considerably quicker than with $NH_3$ radiolysis.

Testing of the sorption-desorption-processes of the products when adding hydrazine hydrate showed that no accumulation of corrosion products occurs on the fuel element wall. The sorption coefficient $K^+$ is lowered to about $1 \cdot 10^{-5}$ to $0.5 \cdot 10^{-5}$ sec.$^{-1}$, which is in conformity with the cleaning coefficient. This results in an inactivation of the contaminated surfaces. Surfaces are free from contamination.

This enables a lower contamination for a gamma dosage efficiency of no more than about 1 R/h, which is considerably below the contamination of presently operating nuclear power plants.

The method of the invention may be used in presently operating nuclear power plants as well as in future nuclear power plants.

In operating nuclear power plants the method is carried out as follows:

First, hydrogen is continuously removed from the coolant through the ventilation systems or in any other manner. In practice this corresponds to a degassing of the coolant at a volume of 5 to 15 t/h.

Thereafter, the addition of $NH_3$ is stopped without changing the remaining parameter of the coolant.

Hydrazine hydrate is then continuously fed (instead of $NH_3$) to the additional water in such amounts to assure $5 \cdot 10^{-8}$ to $5 \cdot 10^{-2}$ g/kg coolant of the reactor.

Due to the continuous addition of hydrazine hydrate and its radiolytic synthesis of $NH_3$, which in this case is present in excess in the beginning phase, the following balance occurs in the hydrazine hydrate system:

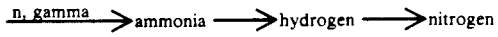

During the balance the $E_h$ value of the potential severely changes into the negative area, whereby effects are obtained which enhance a reduction of the contamination of the reactor. The invention will be explained in more detail in conjunction with the following examples:

EXAMPLE 1

After the nuclear reactor is brought into operating condition for energy generation, hydrazine hydrate is added to the additional water in such an amount that its content is $2 \cdot 10^{-5}$ to $4 \cdot 10^{-5}$ g/kg coolant of a sample taken from the reactor. The continuous removal of hydrogen which is generated during the radiolysis of hydrazine hydrate is performed by degassing the coolant in the system ventilator-feeding at a throughput of 6 t/t. Thereby the KOH amount is maintained at a range of 0.45 to 0.05 mM/kg coolant, depending on the $H_3BO_3$ concentration. After lengthy tests the gamma dosage efficiency measured on the axis of the cold and warm collector of the steam generator did not exceed 1 R/h, but had been in a range of 0.3 to 1.0 R/h.

EXAMPLE 2

After stopping the addition of $NH_3$ as well as with continuous removal of the $H_2$ excess hydrazine hydrate as in Example 1 was added in corresponding amounts to the additional water of a nuclear reactor, which had been working for more than 5 years with $NH_3$, potassium and boron. Gamma-dosage efficiency was measured on the collector axis of the steam generator and it was found that it had been lowered from 7.4 R.h to 1.25 R/h.

Continuous adding of hydrazine hydrate can be used with $H_3BO_3$ reactors by adjusting the coolant with KOH as well as with LiOH.

What is claimed is:

1. Method for treating the primary coolant of a pressurized water nuclear reactor by controlling its efficiency through the $H_3BO_3$ content in the coolant, which comprises; continuously adding hydrazine hydrate to the coolant of the reactor, which is charged for energy generation, in such amounts that its content is $5 \cdot 10^{-6}$ to $5 \cdot 10^{-2}$ g/kg coolant; and removing excess hydrogen from the coolant leaving a content of no more than 100 n.ml/kg.

2. Method in accordance with claim 1 wherein hydrogen excess is removed by ventilation.

3. Method in accordance with claim 1 wherein hydrogen excess is removed from coolant leaving a content of 50 to 60 n.ml/kg.

* * * * *

UNITED STATES PATENT AND TRADEMARK OFFICE
CERTIFICATE OF CORRECTION

PATENT NO. :   5,307,391
DATED      :   April 26, 1994
INVENTOR(S) :  Vladimir I. Pasevic and Dmitrii V. Pasevic It is certified that error appears in the above-identified patent and that said Letters Patent is hereby corrected as shown below:

Col. 2, line 66; after "2." insert -- Severe accumulation of corrosion products on -- .

Signed and Sealed this

Ninth Day of August, 1994

Attest:

Attesting Officer

BRUCE LEHMAN

Commissioner of Patents and Trademarks